(12) United States Patent
Fujino et al.

(10) Patent No.: US 10,895,765 B2
(45) Date of Patent: Jan. 19, 2021

(54) OPTICAL MODULATION ELEMENT

(71) Applicants: SUMITOMO OSAKA CEMENT CO., LTD., Tokyo (JP); TOHOKU UNIVERSITY, Sendai (JP)

(72) Inventors: Tetsuya Fujino, Tokyo (JP); Masayuki Motoya, Tokyo (JP); Tetsuya Goto, Miyagi (JP)

(73) Assignees: SUMITOMO OSAKA CEMENT CO., LTD., Tokyo (JP); TOHOKU UNIVERSITY, Sendai (JP)

( * ) Notice: Subject to any disclaimer, the term of this patent is extended or adjusted under 35 U.S.C. 154(b) by 0 days.

(21) Appl. No.: 16/497,943

(22) PCT Filed: Mar. 27, 2018

(86) PCT No.: PCT/JP2018/012408
§ 371 (c)(1),
(2) Date: Sep. 26, 2019

(87) PCT Pub. No.: WO2018/181297
PCT Pub. Date: Oct. 4, 2018

(65) Prior Publication Data
US 2020/0026146 A1    Jan. 23, 2020

(30) Foreign Application Priority Data

Mar. 31, 2017 (JP) ................... 2017-069820

(51) Int. Cl.
*G02F 1/225* (2006.01)
*G02F 1/035* (2006.01)
*G02F 1/21* (2006.01)

(52) U.S. Cl.
CPC ............ *G02F 1/035* (2013.01); *G02F 1/2255* (2013.01); *G02F 2001/212* (2013.01)

(58) Field of Classification Search
CPC ... G02F 1/035; G02F 1/2255; G02F 2001/212
See application file for complete search history.

(56) References Cited

U.S. PATENT DOCUMENTS

| 5,214,724 A | 5/1993 | Seino et al. |
| 5,479,552 A | 12/1995 | Kitamura et al. |

(Continued)

FOREIGN PATENT DOCUMENTS

| JP | S64-91111 | 4/1989 |
| JP | H3-253815 | 11/1991 |

(Continued)

OTHER PUBLICATIONS

International Search Report, dated May 6, 2018, 2 pages.

*Primary Examiner* — Daniel Petkovsek
(74) *Attorney, Agent, or Firm* — Rankin, Hill & Clark LLP

(57) ABSTRACT

In a waveguide-type optical modulation element that modulates light by applying radio frequency signals to an electrode, the realization of the additional broadening of the bandwidth by improving the degree of freedom in the design of the electrode is enabled. An optical modulation element, which includes optical waveguides provided in a substrate and electrodes that control light waves propagating through the optical waveguides and modulates light by propagating radio frequency signals to the electrodes, in which the electrodes include conductive layers made of copper or a copper alloy and protective layers made of a material other than copper and a copper alloy.

5 Claims, 2 Drawing Sheets

(56) References Cited

U.S. PATENT DOCUMENTS

| | | | |
|---|---|---|---|
| 5,949,944 A | 9/1999 | Minford et al. | |
| 6,198,855 B1* | 3/2001 | Hallemeier | G02F 1/035 385/2 |
| 6,810,181 B2* | 10/2004 | Yamaguchi | G02F 1/065 385/147 |
| 7,054,054 B1* | 5/2006 | Srinivasan | G02B 26/0825 359/295 |
| 10,416,526 B2* | 9/2019 | Kondou | G02F 1/0356 |
| 2001/0008569 A1* | 7/2001 | Rangary | G02F 1/0316 385/3 |
| 2008/0069490 A1 | 3/2008 | Abe et al. | |
| 2015/0277156 A1 | 10/2015 | Kondou | |
| 2018/0284558 A1* | 10/2018 | Miyazaki | G02F 1/2257 |

FOREIGN PATENT DOCUMENTS

| | | |
|---|---|---|
| JP | H7-64126 | 3/1995 |
| JP | H08-122722 | 5/1996 |
| JP | H09-213730 | 8/1997 |
| JP | H09-269469 | 10/1997 |
| JP | H10-41328 | 2/1998 |
| JP | 2015-197454 | 11/2015 |
| WO | 2006/004139 | 1/2006 |

\* cited by examiner

OPTICAL MODULATION ELEMENT

TECHNICAL FIELD

The present invention relates to an optical modulation element that carries out optical modulation by controlling light waves propagating through an optical waveguide and particularly to an optical modulation element capable of improving the degree of freedom in the design of an electrode that controls the light waves using radio frequency signals in a broad band.

BACKGROUND ART

Recently, in the field of optical communication or optical measurement, waveguide-type optical modulation elements having an optical waveguide disposed in a substrate having an electro-optic effect have been in broad use. Generally, the waveguide-type optical modulation element includes a control electrode for controlling light waves that propagate through the optical waveguide together with the optical waveguide.

As such waveguide-type optical modulation elements, for example, Mach-Zehnder-type optical modulation elements in which lithium niobate ($LiNbO_3$) (also referred to as "LN") that is a ferroelectric crystal is used for the substrate are in broad use. The Mach-Zehnder-type optical modulation element has an input optical waveguide for introducing light waves from the outside and an optical branching unit for propagating light introduced through the input optical waveguide to two separate paths. In addition, the Mach-Zehnder-type optical modulation element has, behind the optical branching unit, two parallel optical waveguides that propagate the respective branched light waves and an output optical waveguide for multiplexing the light waves that have propagated through the two parallel optical waveguides and outputting the light waves to the outside. In addition, the Mach-Zehnder-type optical modulation element includes a control electrode for controlling light waves by applying a voltage to change the phases of the light waves that propagate through the parallel optical waveguides using the electro-optic effect. Generally, the control electrode includes a signal electrode (radio frequency electrode) disposed in an upper portion or a vicinity of the parallel optical waveguides and a ground electrode disposed apart from the signal electrode and configures a signal line that propagates radio frequency signals at the same rate as the propagation rates of light waves in the parallel optical waveguides.

In the related art, as a material for the control electrode in the Mach-Zehnder-type optical modulation element in which the LN substrate is used, gold (Au) is used from the viewpoint of the long-term stability of the material and easiness in manufacturing such as bonding. Meanwhile, from the viewpoint of an optical modulation operation carried out by propagating radio frequency signals through the signal line that the control electrode configures, the material desirably has a higher conductivity and a small conductor loss. That is, in order to broaden the bandwidth at a desired characteristic impedance by alleviating a trade-off limitation between the radio frequency propagation loss and the characteristic impedance in the control electrode, it becomes necessary to decrease the conductor loss of the control electrode.

Therefore, in the related art, the conductor loss is decreased by thickening the control electrode or broadening the width of a part of the control electrode to provide a mushroom-shaped cross section and thus increasing the cross-sectional area of the control electrode (refer to Patent Literature Nos. 1 and 2).

However, there is a limit on the degree of a decrease in the conductor loss that can be realized by an effort regarding the cross-sectional shape or size of the control electrode, and it is desired to broaden the degree of freedom in the design of the control electrode by further alleviating the trade-off limitation for the additional broadening of the bandwidth.

CITATION LIST

Patent Literature

[Patent Literature No. 1] Japanese Laid-open Patent Publication No. H1-91111
[Patent Literature No. 2] Japanese Laid-open Patent Publication No. H8-122722

SUMMARY OF INVENTION

Technical Problem

Due to the above-described background, in waveguide-type optical modulation elements that modulate light by propagating radio frequency signals to a control electrode formed on an optical waveguide, it is desired to enable the realization of the additional broadening of the bandwidth by broadening the degree of freedom in the design of the control electrode.

Solution to Problem

An aspect of the present invention is an optical modulation element which includes an optical waveguide provided in a substrate and a control electrode that controls light waves propagating through the optical waveguide and modulates light by propagating radio frequency signals to the control electrode, in which the electrode includes a conductive layer made of copper (Cu) or a copper alloy and a protective layer made of a material other than copper and a copper alloy.

According to another aspect of the present invention, at least a part of the protective layer is provided on the substrate, and the conductive layer is provided on the at least a part of the protective layer provided on the substrate.

According to another aspect of the present invention, at least a part of the protective layer is provided so as to cover a surface of the conductive layer.

According to another aspect of the present invention, one part of the protective layer is provided on the substrate, and the conductive layer is provided on the one part of the protective layer, and an other part of the protective layer is provided so as to cover a surface of the conductive layer.

According to another aspect of the present invention, the protective layer is not provided on a region of the surface of the substrate in which the conductive layer is not provided.

According to another aspect of the present invention, the protective layer is made of a metal nitride and/or silicon (Si).

According to another aspect of the present invention, the metal nitride is SiN, CrN, TiN, and/or CuN.

According to another aspect of the present invention, a surface layer made of gold (Au) is formed on at least a part of an upper surface of the electrode.

Meanwhile, all of the contents of Japanese Patent Application No. 2017-69820 filed on Mar. 31, 2017 are regarded to be included in this specification.

DESCRIPTION OF EMBODIMENTS

Hereinafter, an embodiment of the present invention will be described with reference to the drawings.

Figure 1:
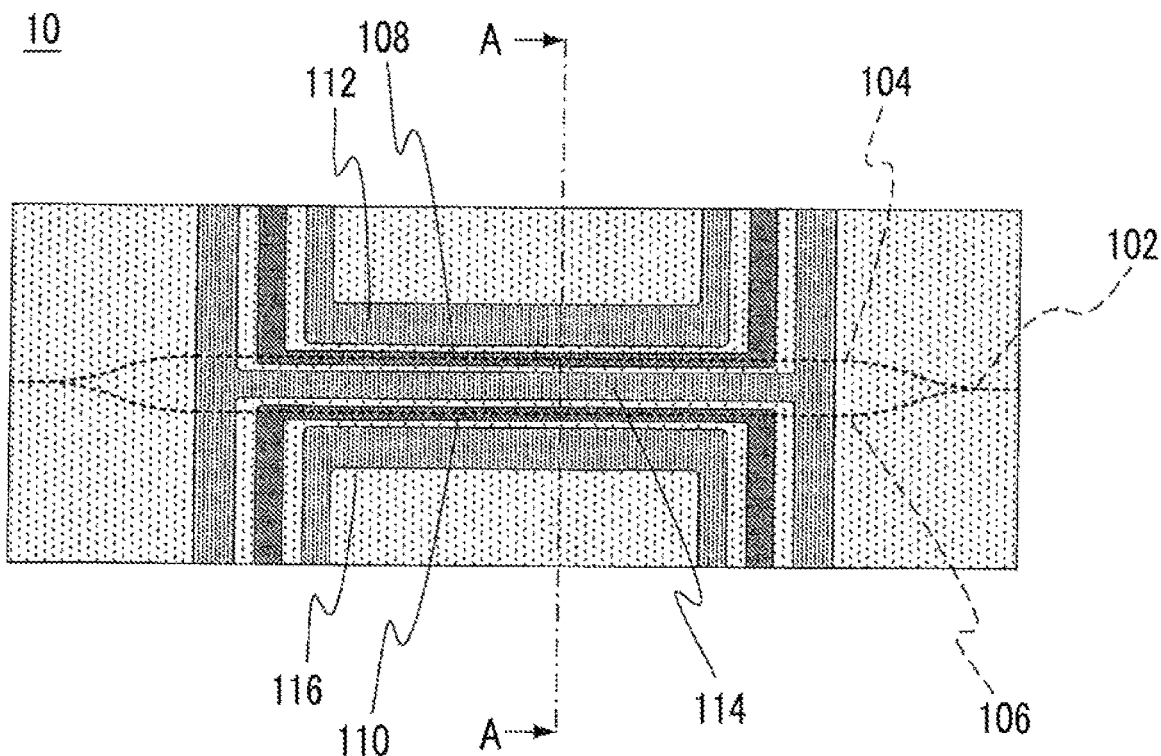
FIG. 1 is a view showing a configuration of an optical modulation element according to an embodiment of the present invention.
Figure 2:
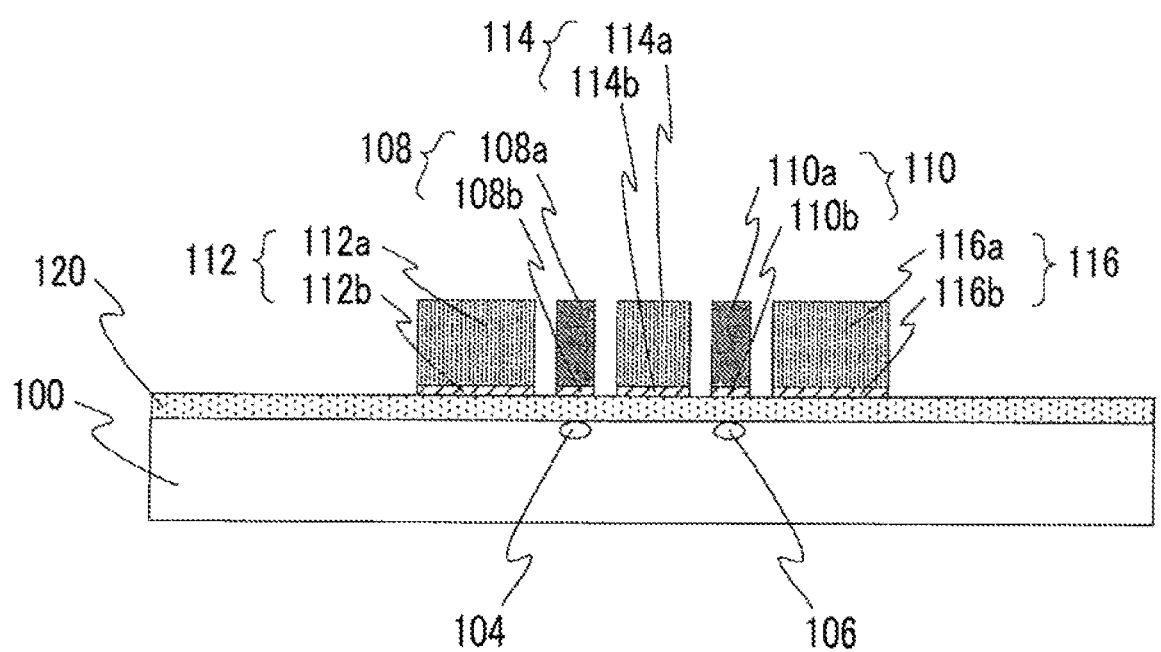
FIG. 2 is a cross-sectional view of the optical modulation element shown in FIG. 1 in a direction of an arrow AA.

FIG. 1 is a view showing a configuration of an optical modulation element according to an embodiment of the present invention. In addition, FIG. 2 is a cross-sectional view of the optical modulation element shown in FIG. 1 in a direction of an arrow AA. The present optical modulation element 10 is a Mach-Zehnder-type optical modulation element having a Mach-Zehnder (MZ)-type optical waveguide 102 disposed on a substrate 100.

The substrate 100 is a substrate made of lithium niobate (LN) having an electro-optic effect and is, for example, a Z-cut LN substrate. On the substrate 100, a non-conductive layer 120 made of a non-conductive material is disposed. This non-conductive layer 120 is provided for the purpose of, for example, avoiding the generation of an optical loss attributed to the absorption of light waves that propagate through an MZ-type optical waveguide 102 by a signal electrode 108 described below or the like and the like, and, a so-called buffer layer can be used. Such a buffer layer is made of, for example, a material having a lower dielectric constant than the substrate 100 (specific materials will be described below).

The MZ-type optical waveguide 102 has optical waveguides 104 and 106 that are parallel optical waveguides. Signal electrodes 108 and 110 to which radio frequency signals are applied are respectively disposed along the optical waveguides 104 and 106 right above the optical waveguides 104 and 106. In addition, ground electrodes 112, 114, and 116 are disposed apart from the respective signal electrodes 108 and 110 by predetermined separation distances so as to clamp the signal electrodes 108 and 110. The signal electrode 108 and the ground electrodes 112 and 114 and the signal electrode 110 and the ground electrodes 114 and 116 respectively configure signal lines in which radio frequency signals propagate (radio frequency signal lines). Light waves input from a shown left end of the MZ-type optical waveguide 102 are modulated (for example, modulated in intensity) by these radio frequency signals and outputted from a shown right end.

Particularly, in the optical modulation element 10 of the present embodiment, the signal electrodes 108 and 110 and the ground electrodes 112, 114, and 116 respectively include conductive layers 108a, 110a, 112a, 114a, and 116a made of copper (Cu) or a copper alloy. As the copper alloy, for example, an Al—Cu alloy, a Ni—Cu alloy, a Be—Cu alloy, or a Sn—Cu alloy can be used. The conductivity of the copper (Cu) or copper alloy is higher than that of gold (Au) that is used as an electrode material in optical modulation elements of the related art. Therefore, in the optical modulation element 10, the conductor loss in the radio frequency signal line that the signal electrodes 108 and 110 and the ground electrodes 112, 114, and 116 configure is effectively decreased.

In addition, a decrease in the conductor loss alleviates the trade-off limitation between the radio frequency propagation loss and the characteristic impedance in the radio frequency signal lines that the signal electrode 108 and 110 and the like configure (that is, broadens the degree of freedom in the design of the signal electrodes 108 and 110 and the ground electrodes 112, 114, and 116 which configure the signal lines) and facilitates the additional broadening of the bandwidth at a desired characteristic impedance.

Furthermore, in the optical modulation element 10 of the present embodiment, the signal electrodes 108 and 110 and the ground electrodes 112, 114, and 116 respectively have protective layers 108b, 110b, 112b, 114b, and 116b having the conductive layers 108a, 110a, 112a, 114a, and 116a provided in upper portions of the protective layers. These protective layers 108b, 110b, 112b, 114b, and 116b are made of a material other than copper (Cu) and a copper alloy and are made of, for example, a metal nitride and/or silicon (Si). As the metal nitride, for example, SiN, CrN, TiN, and/or CuN can be used. Here, the protective layer 130 and the like may include a single layer made of any one of these materials or may include a plurality of layers made of mutually different materials.

Generally, when an electrode (copper electrode) made of copper (Cu) and another electrode are disposed close to each other on a substrate, and a potential difference is generated between the copper electrode and the another electrode, copper ions migrate from the copper electrode along a surface of the substrate, and so-called electromigration can occur. When such electromigration occurs, the migrated copper ions successively precipitate copper on the surface of the substrate, and a short-circuit path can be formed between the copper electrode and the another electrode.

In contrast, in the optical modulation element 10 of the present embodiment, the conductive layers 108a, 110a, 112a, 114a, and 116a of the signal electrodes 108 and 110 and the ground electrodes 112, 114, and 116 are respectively formed on the protective layers 108b, 110b, 112b, 114b, and 116b. Therefore, the migration of the copper ions of copper (Cu) or the copper alloy configuring the conductive layers 108a, 110a, 112a, 114a, and 116a is hindered by the protective layers 108b, 110b, 112b, 114b, and 116b, and the occurrence of electromigration is prevented.

In the optical modulation element 10 of the present embodiment, due to the above-described configuration, it is possible to maintain high-level long-term reliability by suppressing the migration of metal configuring the electrode and realize the additional broadening of the bandwidth by broadening the degree of freedom in the design of the electrode.

Meanwhile, the protective layer made of the metal nitride or Si without including copper (Cu) and a copper alloy does not need to be provided in a region in the region of a substrate surface of the substrate 100 in which electrodes such as the signal electrode 108 and the like or the ground electrode 112 and the like are not provided.

Next, modification examples of the present embodiment will be described.

First Modification Example

Figure 3:
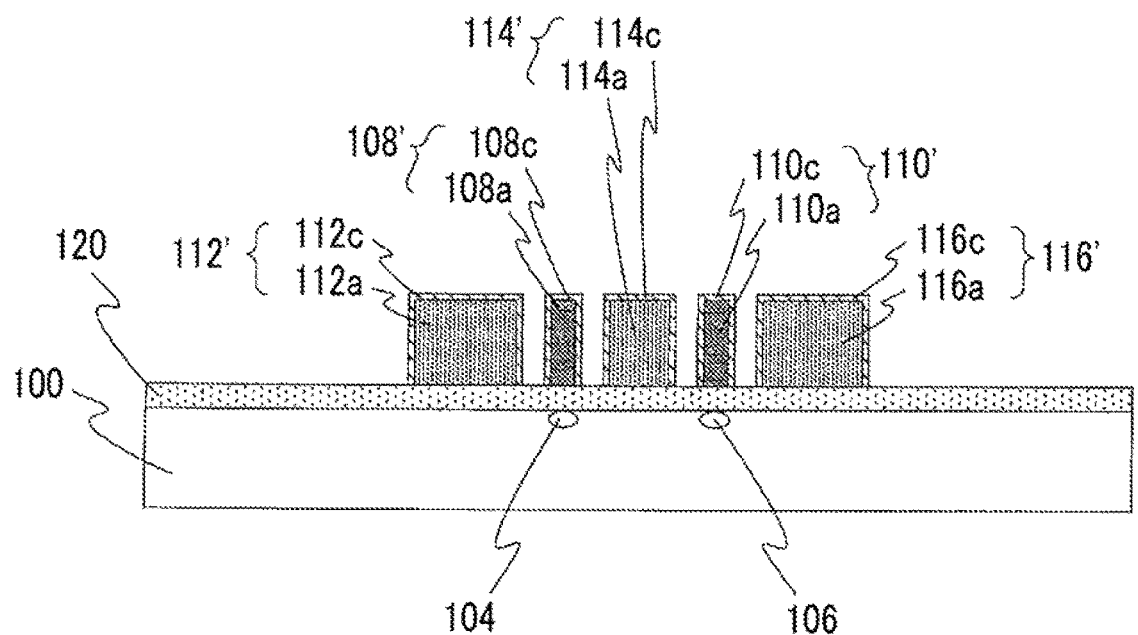
FIG. 3 is a view showing a configuration of a first modification example of a control electrode configuring the optical modulation element.

FIG. 3 is a view showing a configuration of signal electrodes 108' and 110' and ground electrodes 112', 114', and 116' that can be used instead of the signal electrodes 108 and 110 and the ground electrodes 112, 114, and 116 shown in FIG. 3.

Similar to the signal electrodes 108 and 110 and the ground electrodes 112, 114, and 116, the signal electrodes 108' and 110' and the ground electrodes 112', 114', and 116' respectively have the conductive layers 108a, 110a, 112a, 114a, and 116a. However, the signal electrodes 108' and 110' and the ground electrodes 112', 114', and 116' do not include the protective layers 108b, 110b, 112b, 114b, and 116b, but, instead, have protective layers 108c, 110c, 112c, 114c, and 116c covering the conductive layers 108a, 110a, 112a, 114a, and 116a.

That is, in the present modification example, the protective layers 108c, 110c, 112c, 114c, and 116c covering the conductive layers 108a, 110a, 112a, 114a, and 116a prevent the electromigration of the copper ions from the conductive layers 108a, 110a, 112a, 114a, and 116a.

Second Modification Example

Figure 4:
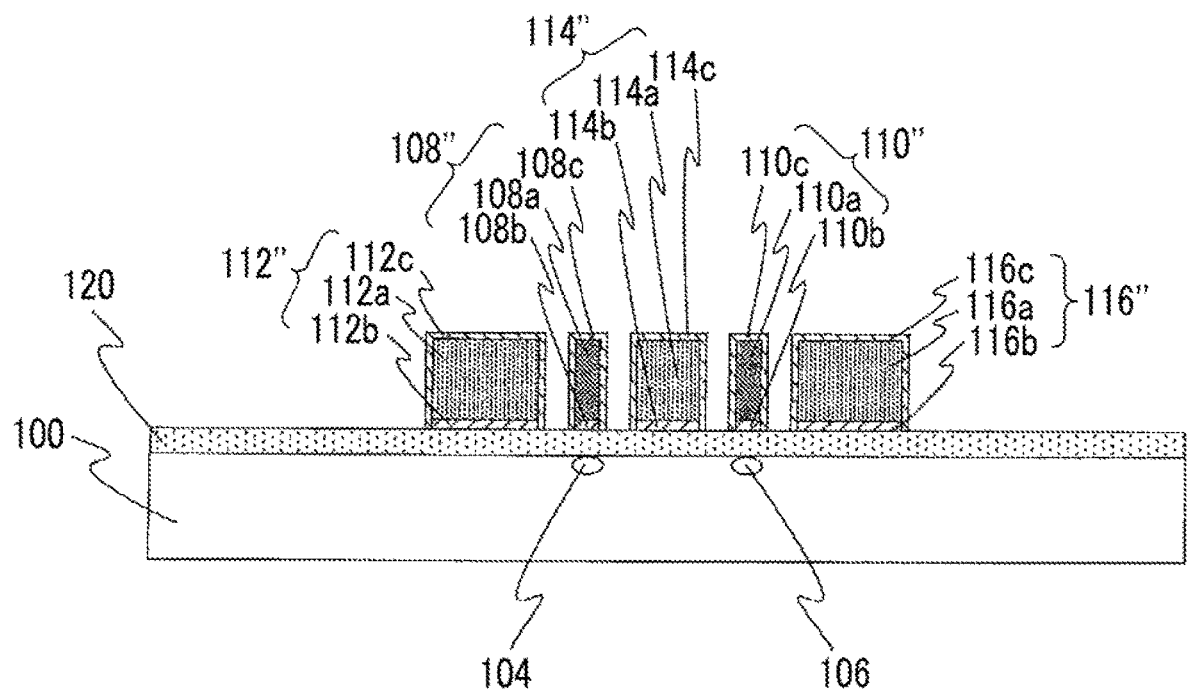
FIG. 4 is a view showing a configuration of a second modification example of the control electrode configuring the optical modulation element.

FIG. 4 is a view showing a configuration of signal electrodes 108" and 110" and ground electrodes 112", 114", and 116" that can be used instead of the signal electrodes 108 and 110 and the ground electrodes 112, 114, and 116 shown in FIG. 2.

The signal electrodes 108" and 110" and the ground electrodes 112", 114", and 116" respectively include the conductive layers 108a, 110a, 112a, 114a, and 116a and the protective layers 108b, 110b, 112b, 114b, and 116b. In addition, the signal electrodes 108" and 110" and the ground electrodes 112", 114", and 116" further have the protective layers 108c, 110c, 112c, 114c, and 116c covering the conductive layers 108a, 110a, 112a, 114a, and 116a.

Therefore, in the present modification example, the occurrence of the electromigration of the copper ions from copper (Cu) or the copper alloy configuring the conductive layers 108a, 110a, 112a, 114a, and 116a is further decreased, whereby it is possible to further improve the reliability of the optical modulation element 10.

Hitherto, as described above, in the optical modulation element 10 according to the present embodiment, the signal electrode 108 and 110 and the ground electrodes 112, 114, and 116 that modulate light waves that propagate through the optical waveguides 104 and 106 respectively include the protective layers 108b, 110b, 112b, 114b, and 116b made of a metal nitride or silicon (Si) and the conductive layers 108a, 110a, 112a, 114a, and 116a that are provided on the protective layers and made of copper (Cu) or a copper alloy.

Therefore, in the optical modulation element 10, the occurrence of the electromigration of copper ions can be prevented or decreased, and thus it is possible to improve the reliability and alleviate the trade-off limitation between the radio frequency propagation loss and the characteristic impedance in the radio frequency signal lines that the signal electrodes 108 and 110 and the like configure. As a result, in the optical modulation element 10, it is possible to broaden the degree of freedom in the design of the signal electrodes 108 and 110 and the like and additionally broaden the bandwidth at a desired characteristic impedance.

Meanwhile, in the above-described embodiment, the conductive layers 108a, 110a, 112a, 114a, and 116a configuring the signal electrode 108 and 110 and the ground electrodes 112, 114, and 116 are respectively made of copper (Cu) or a copper alloy in their entirety, but the configuration is not limited to the above-described configuration. The respective conductive layers may also be made of copper (Cu) or a copper alloy in at least a part of a cross section of the conductive layer. Even in such a case, it is possible to realize a higher conductivity than that of an electrode which does not include a copper (Cu) or copper alloy component, but includes gold (Au) as a main body as in the related art, and it is possible to broaden the degree of freedom in the design of the electrodes.

In addition, in the above-described embodiment, as an example, the optical modulation element in which the substrate 100 that is a Z-cut LN substrate is used has been described, but the configuration is not limited to the above-described optical modulation element. The configuration of the electrodes such as the signal electrode 108 and the like described in the present embodiment can be used in the same manner even in optical modulation elements configured using an X-cut LN substrate. Furthermore, the configuration of the electrode is not limited to the optical modulation element in which the LN substrate is used and can also be applied in the same manner to optical modulation elements in which other materials having an electro-optic effect (for example, $LiTaO_3$, $SrTiO_3$, $SrBi_2Ta_2O_9$, $BaTiO_3$, $KTiOPO_4$, and PLZT) are used as a substrate or optical modulation elements in which a semiconductor substrate that modulates light by controlling the refractive index of an optical waveguide by current injection is used.

Meanwhile, in the above-described embodiment, the conductive layers 108a, 110a, 112a, 114a, and 116a are made of copper (Cu) or a copper alloy, and thus, in the case of carrying out wire bonding (for example, the bonding of a gold wire) on these conductive layers, it can become difficult to realize the bonding intensity on a practical level. In such a case, it is possible to provide a surface layer made of gold (Au) on a part (in the present embodiment) of the upper surface of the signal electrodes 108 and 110 and the ground electrodes 112, 114, and 116 and carry out wire bonding on the surface layer. Therefore, it becomes possible to carry out highly reliable wire bonding.

REFERENCE SIGNS LIST

10 . . . OPTICAL MODULATION ELEMENT, 100 . . . SUBSTRATE, 102 . . . MZ-TYPE OPTICAL WAVEGUIDE, 104, 106 . . . OPTICAL WAVEGUIDE, 108, 110 . . . SIGNAL ELECTRODE, 112, 114, 116 . . . GROUND ELECTRODE, 120 . . . NON-CONDUCTIVE LAYER, 108a, 110a, 112a, 114a, 116a . . . CONDUCTIVE LAYER, 108b, 110b, 112b, 114b, 116b, 108c, 110c, 112c, 114c, 116c . . . PROTECTIVE LAYER

The invention claimed is:
1. An optical modulation element comprising:
an optical waveguide provided in a substrate; and
an electrode that controls light waves propagating through the optical waveguide,
the optical modulation element modulating light by propagating radio frequency signals to the electrode,
wherein the electrode includes
a conductive layer made of copper (Cu) or a copper alloy and
a protective layer made of a material other than copper and the copper alloy,
wherein a surface layer constituted of gold (Au) is formed on at least a part of an upper surface of the electrode opposite to the substrate, and
wherein the protective layer is made of CuN or CrN.

2. The optical modulation element according to claim 1, wherein at least a part of the protective layer is provided on the substrate, and the conductive layer is provided on the at least a part of the protective layer provided on the substrate.

3. The optical modulation element according to claim 1, wherein at least a part of the protective layer is provided so as to cover a surface of the conductive layer.

4. The optical modulation element according to claim 1, wherein one part of the protective layer is provided on the substrate, the conductive layer is provided on the one part of the protective layer, and another part of the protective layer is provided so as to cover a surface of the conductive layer.

5. The optical modulation element according to claim 1, wherein the protective layer is not provided on a region where the electrode is not provided among a region of a substrate surface of the substrate.

* * * * *